US007477805B2

(12) United States Patent
Ohtsuka et al.

(10) Patent No.: US 7,477,805 B2
(45) Date of Patent: Jan. 13, 2009

(54) ELECTRONIC ALBUM DISPLAY SYSTEM, AN IMAGE GROUPING APPARATUS, AN ELECTRONIC ALBUM DISPLAY METHOD, AN IMAGE GROUPING METHOD, AND A MACHINE READABLE MEDIUM STORING THEREON A COMPUTER PROGRAM

(75) Inventors: Shuichi Ohtsuka, Kanagawa (JP); Kazuo Shiota, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 358 days.

(21) Appl. No.: 11/176,316

(22) Filed: Jul. 8, 2005

(65) Prior Publication Data

US 2006/0056737 A1  Mar. 16, 2006

(30) Foreign Application Priority Data

Sep. 10, 2004 (JP) ............................. 2004-264555

(51) Int. Cl.
*G06K 9/54* (2006.01)
*G06K 9/62* (2006.01)
*H04N 5/76* (2006.01)

(52) U.S. Cl. ................ 382/305; 382/209; 348/231.002; 707/E17.029

(58) Field of Classification Search ................ 382/209, 382/305; 348/231.2; 707/E17.029
See application file for complete search history.

(56) References Cited

U.S. PATENT DOCUMENTS 6,606,411 B1* 8/2003 Loui et al. .................. 382/224

| 6,970,192 | B2* | 11/2005 | Takayama ................ 348/231.2 |
| 2002/0008622 | A1* | 1/2002 | Weston et al. ............ 340/572.1 |
| 2002/0103813 | A1* | 8/2002 | Frigon ..................... 707/104.1 |
| 2004/0264780 | A1* | 12/2004 | Zhang et al. ................ 382/224 |
| 2005/0093976 | A1* | 5/2005 | Valleriano et al. ........... 348/143 |
| 2005/0094879 | A1* | 5/2005 | Harville ..................... 382/209 |
| 2007/0133907 | A1* | 6/2007 | Yamamoto et al. .......... 382/305 |

FOREIGN PATENT DOCUMENTS

JP     2004-13575 A    1/2004

* cited by examiner

*Primary Examiner*—Samir A Ahmed
*Assistant Examiner*—Stephen R Koziol
(74) *Attorney, Agent, or Firm*—Birch, Stewart, Kolasch & Birch, LLP (57) ABSTRACT

It is an object to improve convenience of browse and search of a plurality of images. an electronic album display system for displaying a plurality of images included in an electronic album is provided, wherein the system includes: an image storing unit in which the plurality of images are stored; a person recognizing unit for recognizing a plurality of persons included in each of the plurality of images; an image grouping unit for classifying the plurality of images into a plurality of groups by the kind of a combination of persons included in an image on the basis of the recognition result by the person recognizing unit; a representative image selecting unit for selecting a representative image from each of the plurality of groups; and an image display unit for displaying each of the selected representative images consecutively.

12 Claims, 8 Drawing Sheets

| IMAGE IDENTIFICATION NUMBER | IMAGE DATA | DATE AND TIME OF IMAGE CAPTURING | PLACE OF IMAGE CAPTURING |
|---|---|---|---|
| 100 |  | MAY 4 11:12 | AA DEGREES DD MINUTES OF EAST LONGITUDE BB DEGREES EE MINUTES OF NORTH LATITUDE |
| 101 |  | MAY 4 11:16 | AB DEGREES FF MINUTES OF EAST LONGITUDE BA DEGREES GG MINUTES OF NORTH LATITUDE |
| 102 |  | MAY 5 18:30 | CC DEGREES HH MINUTES OF EAST LONGITUDE CA DEGREES II MINUTES OF NORTH LATITUDE |
| ... | ... | ... | ... |

| PERSON IDENTIFICATION NUMBER | FACE IMAGE DATA |
|---|---|
| 0 |  |
| 1 |  |
| 2 |  |
| ⋮ | ⋮ |

| IMAGE IDENTIFICATION NUMBER | IMAGE DATA | PERSON IDENTIFICATION NUMBER |
|---|---|---|
| 100 |  | 0, 1 |
| 101 |  | 2, 3, 4 |
| 102 |  | 0. 3 |
| ⋮ | ⋮ | ⋮ |

| GROUP IDENTIFICATION NUMBER | PERSON IDENTIFICATION NUMBER | IMAGE IDENTIFICATION NUMBER |
|---|---|---|
| 0 | 0, 1 | 100 |
| | | 106 |
| | | ⋮ |
| 1 | 0, 3 | 102 |
| | | ⋮ |
| ⋮ | ⋮ | ⋮ |

FIG. 8

ELECTRONIC ALBUM DISPLAY SYSTEM, AN IMAGE GROUPING APPARATUS, AN ELECTRONIC ALBUM DISPLAY METHOD, AN IMAGE GROUPING METHOD, AND A MACHINE READABLE MEDIUM STORING THEREON A COMPUTER PROGRAM

The present application claims priority from a Japanese Patent Application No. 2004-264555 filed on Sep. 10, 2004, the contents of which are incorporated herein by reference.

BACKGROUND OF THE INVENTION

1. Field of the Invention

The present invention relates to an electronic album display system, an image grouping apparatus, an electronic album display method, an image grouping method, and a machine readable medium storing thereon a computer program. More particularly, the present invention relates to an electronic album display system, an image grouping apparatus, an electronic album display method, and a machine readable medium storing thereon a computer program for grouping and displaying images.

2. Description of the Related Art

Conventionally, a technique for grouping and displaying images captured by a camera and the like is known (for example, see Japanese Patent Application Laid-Open No. 2004-13575). The technique makes it easy to arrange and store a plurality of images and to search for and browse an image by grouping the images, for example, on the basis of image capturing time. Further, the technique makes it possible to display only a representative image of each group as well as to display all the images. By this, it is possible to quickly perceive which image is included.

SUMMARY OF THE INVENTION

However, sometimes it is difficult to perceive which group includes each image according to a reference of grouping, which makes a user suffer inconvenience. For example, even if images are grouped by image capturing time, a user suffers inconvenience because he should check every image in case he intends to browse all images of which objects are the same person.

Further, in case the number of images included in each group differs, sometimes convenience is seriously damaged according to how many images are displayed as representatives for each group. For example, if a small number of representative images are displayed for a group including a large number of images, it is difficult to perceive characteristics of the whole of the group. Further, if a ratio of the number of representative images to the number of images included in each group is constant, it is difficult to perceive characteristics of a group including a relatively small number of images.

As above, it is a problem to be solved to group images by using a proper method making search and browse of images very convenient and to select a representative image making characteristics of each group easily perceived.

Therefore, it is an object of the present invention to provide an electronic album display system, an image-grouping apparatus, an electronic album display method, a method and a machine readable medium storing thereon a computer program for grouping images, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an electronic album display system for displaying a plurality of images included in an electronic album is provided, wherein the system includes: an image storing unit in which the plurality of images are stored; a person recognizing unit for recognizing a plurality of persons included in each of the plurality of images; an image grouping unit for classifying the plurality of images into a plurality of groups by the kind of a combination of persons included in an image on the basis of the recognition result by the person recognizing unit; a representative image selecting unit for selecting a representative image from each of the plurality of groups; and an image display unit for displaying each of the selected representative images consecutively.

Further, the representative image selecting unit may select more representative images from a group in comparison with another group including less images than the group. Further, for each group, the representative image selecting unit may select no representative image in case the number of images of the group is less than a predetermined reference number.

Further, a ratio of the number of representative images selected by the representative image selecting unit from a group to the number of all images included in the group may be higher than that of another group including less images. Further, for each group, the representative image selecting unit may select an image as a representative image of the group in case difference in at least one of image capturing date and time and image capturing place between the group and another representative image selected by the representative image selecting unit is larger than a predetermined reference value Further, in case the number of images in which a person is included as an object is smaller than a predetermined reference number, the image grouping unit may classify the plurality of images by combination of persons included in the plurality of images except the person.

Further, the electronic album display system further includes an image processing unit for performing blurring on a part of each representative image showing a person who is included in images of a number smaller than a predetermined reference number out of the plurality of images, and the image display unit may display the representative image on which blurring is performed.

According to the second aspect of the present invention, an image grouping apparatus for classifying a plurality of images is provided, wherein the apparatus includes: an image storing unit in which the plurality of images are stored; a person recognizing unit for recognizing a plurality of persons included in each of the plurality of images; and an image grouping unit for classifying the plurality of images into a plurality of groups by the kind of a combination of persons included in an image on the basis of the recognition result by the person recognizing unit.

According to the third aspect of the present invention, electronic album display method for displaying a plurality of images included in an electronic album is provided, wherein the method includes: a person recognizing step of recognizing a plurality of persons included in each of the plurality of images; an image grouping step of classifying the plurality of images into a plurality of groups by the kind of a combination of persons included in an image on the basis of the recognition result in the person recognizing step; a representative image selecting step of selecting a representative image from each of the plurality of groups; and an image display step of displaying each of the selected representative images consecutively.

According to the fourth aspect of the present invention, a machine readable medium storing thereon a computer program for making a computer display a plurality of images included in an electronic album is provided, wherein the computer includes: an image storing unit in which the plurality of images are stored; a person recognizing unit for recognizing a plurality of persons included in each of the plurality of images; an image grouping unit for classifying the plurality of images into a plurality of groups by the kind of a combination of persons included in an image on the basis of the recognition result by the person recognizing unit; a representative image selecting unit for selecting a representative image from each of the plurality of groups; and an image display unit for displaying each of the selected representative images consecutively.

According to the fifth aspect of the present invention, an image grouping method for grouping a plurality of images is provided, wherein the method includes: a person recognizing step of recognizing a plurality of persons included in each of the plurality of images; and an image grouping step of classifying the plurality of images into a plurality of groups by the kind of a combination of persons included in an image on the basis of the recognition result in the person recognizing step.

According to the sixth aspect of the present invention, a machine readable medium storing thereon a computer program for making a computer classifies a plurality of images is provided, wherein the computer includes: an image storing unit in which the plurality of images are stored; a person recognizing unit for recognizing a plurality of persons included in each of the plurality of images; and an image grouping unit for classifying the plurality of images into a plurality of groups by the kind of a combination of persons included in an image on the basis of the recognition result by the person recognizing unit.

The summary of the invention does not necessarily describe all necessary features of the present invention. The present invention may also be a sub-combination of the features described above.

According to the present invention, it is possible to improve convenience in case of browsing and searching for a large number of images.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
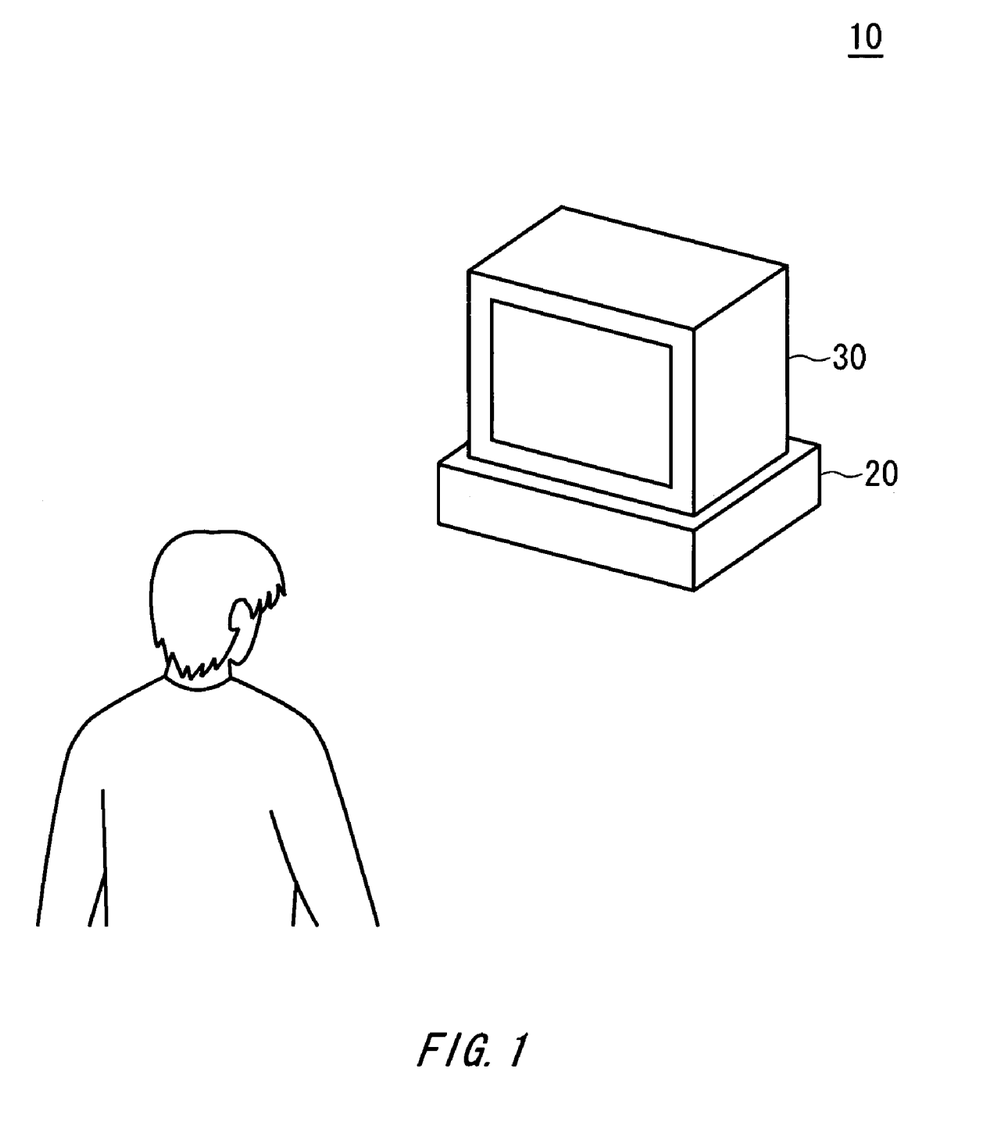
FIG. 1 shows an outline of an electronic album display system 10.

FIG. 1 shows an outline of an electronic album display system 10. The electronic album display system 10 includes an electronic album reproducing unit 20 and an image display unit 30. The electronic album reproducing unit 20 classifies a plurality of images included in an electronic album into a plurality of groups and selects a representative image of each group from the group. Then, the image display unit 30 displays each of the selected representative images consecutively. By this, it is an object to make characteristics of each group easily perceived and to improve convenience of search and browse of images, etc.

Figure 2:
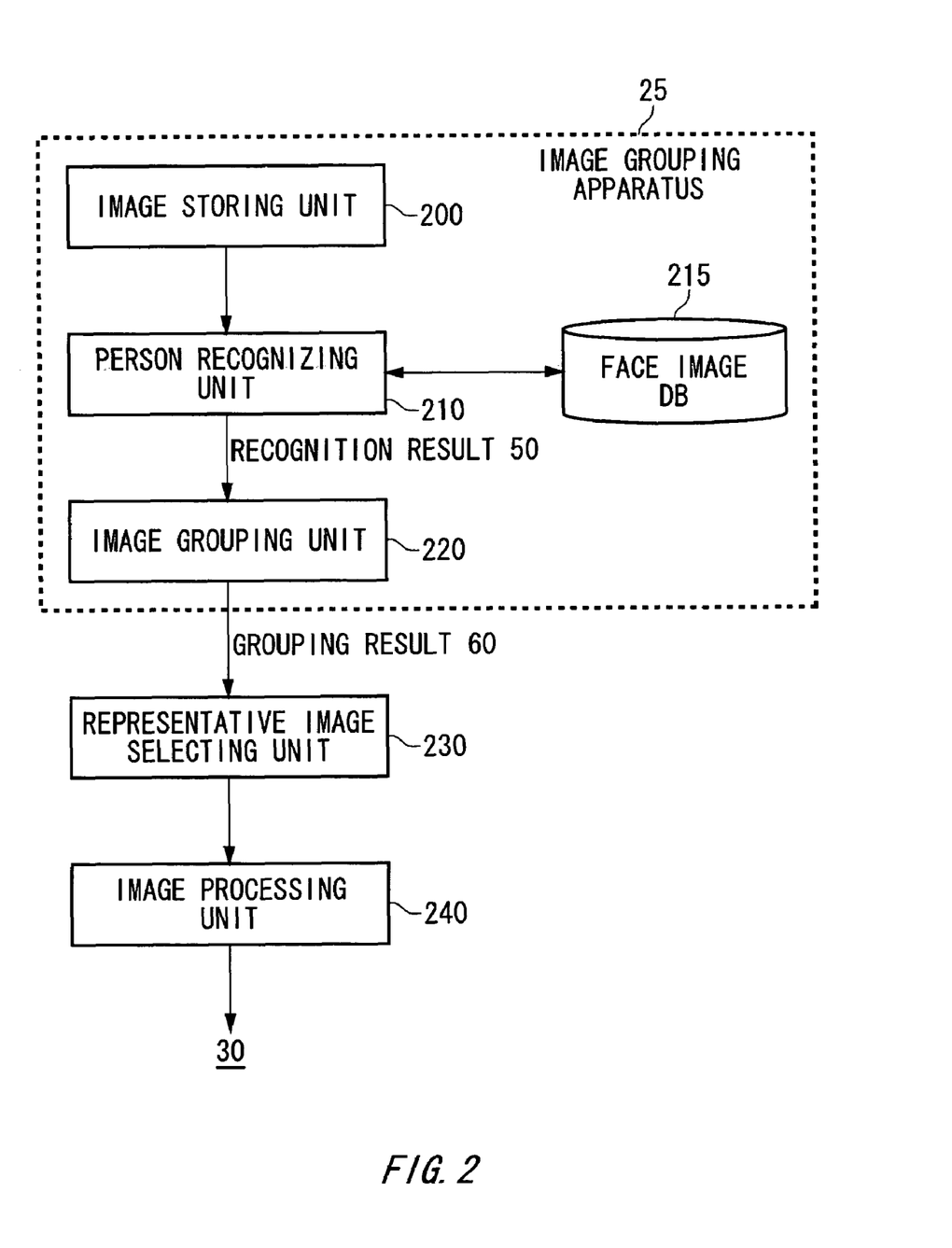
FIG. 2 shows the configuration of an electronic album reproducing unit 20 classified into functional blocks.

FIG. 2 shows the configuration of the electronic album reproducing unit 20 classified into functional blocks. The electronic album reproducing unit 20 includes an image grouping apparatus 25, a representative image selecting unit 230, and an image processing unit 240. The image grouping apparatus 25 classifies stored images into groups. Specifically, the image grouping apparatus 25 includes an image storing unit 200, a person recognizing unit 210, a face image DB 215, and an image grouping unit 220. A plurality of images included in the electronic album are stored in the image storing unit 200. The person recognizing unit 210 recognizes a plurality of persons included in each of the plurality of images.

For example, a face image of each person is previously stored in the face image DB 215. Then, the person recognizing unit 210 recognizes a person included in each of the images included in the image storing unit 200 by comparing the image stored in the image storing unit 200 with the image stored in the face image DB 215. The recognition result is provided as a recognition result 50. Further, in case an image stored in the image storing unit 200 includes a person whose face image is not stored in the face image DB 215, the person recognizing unit 210 may ask a user who the person is. In this case, the person recognizing unit 210 may recognize the person on the basis of the inquiry result and records the face image of the person on the face image DB 215.

The image grouping unit 220 groups a plurality of images by combination of persons included in an image on the basis of the recognition result by the person recognizing unit 210. The grouping result is provided as a grouping result 60. The representative image selecting unit 230 selects a representative image of each of a plurality of groups from the group. At this time, if composition, a person's expression, etc. of an image are similar with those of the representative image, the representative image selecting unit 230 may not consider the image as a representative image. The image processing unit 240 performs a predetermined image processing of each representative image. For example, the image processing unit 240 may convert image data of the representative image into an NTSC signal and transmit it to the image display unit 30. Further, the image processing unit 240 may perform a predetermined image processing in order to improve easiness of browsing images.

Figure 3:
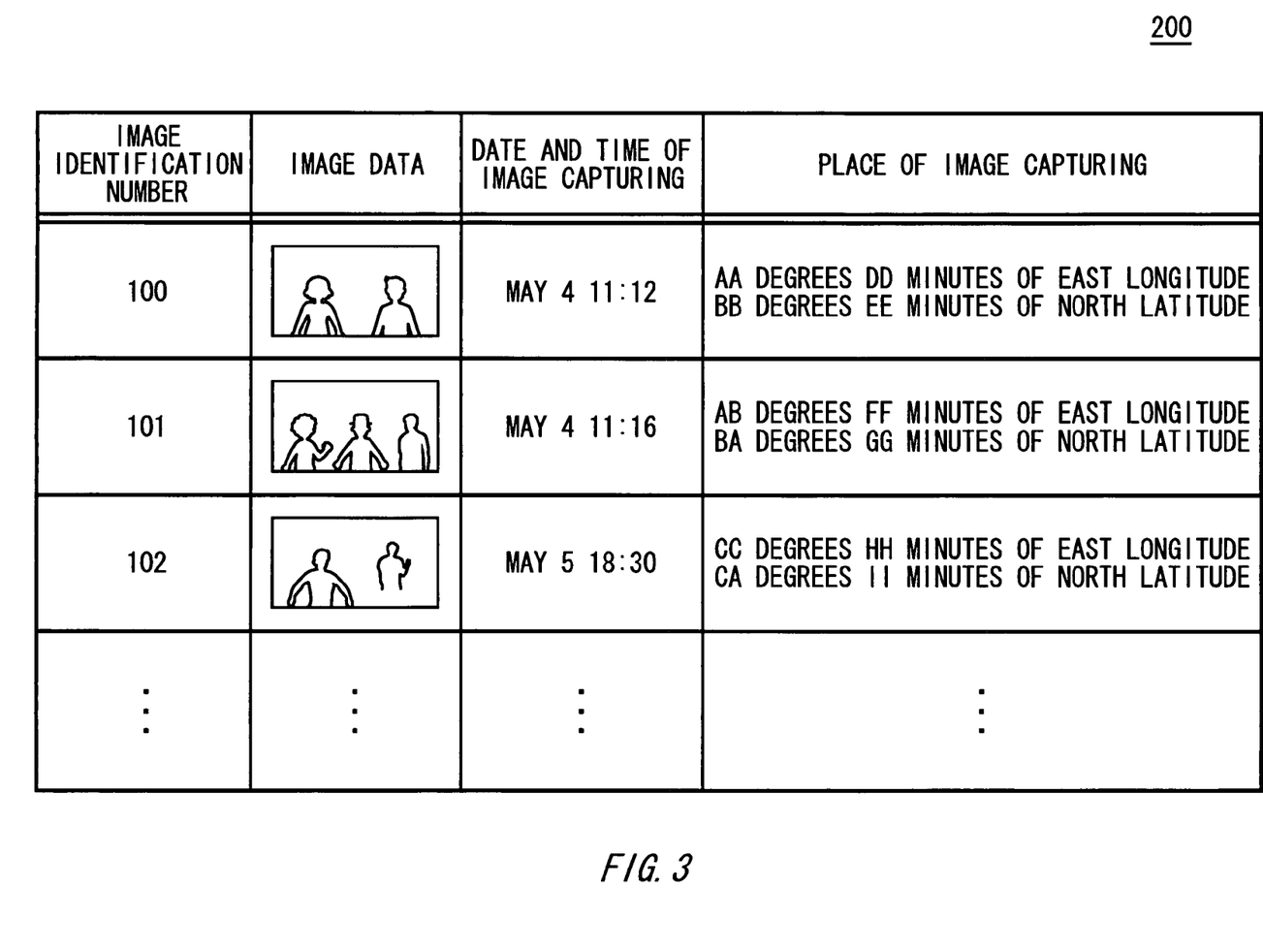
FIG. 3 shows an example of a data structure of an image storing unit 200.

FIG. 3 shows an example of a data structure of the image storing unit 200. For every image identification number, image data showing an image, date and time of capturing the image, and a place of capturing the image are stored in the image storing unit 200. For example, image data of an image in which two persons are included is stored in the image storing unit 200 to correspond to an image identification number 100. Further, information that the image is captured at 11:12 of May 4 and at a place of AA degrees DD minutes of east longitude and BB degrees EE minutes of north latitude is stored in the image storing unit 200 to correspond to the image data. As an example, the information of the date and time of capturing the image and the place of capturing the image may be stored in the image storing unit 200 as tag information stored in the header of the image data and the like (for example, information based on Exif (Exchangeable Image File Format)). Further, the image identification number is an example of an identifier for identifying an image. An identifier of an image may be a file name of image data instead of an image identification number.

As above, each image previously corresponds to date and time of capturing the image and a place of capturing the image. By this, the representative image selecting unit 230 can select a representative image of each group on the basis of image capturing date and time and an image capturing place. For example, the representative image selecting unit 230 may compare date and time and a place of capturing an image of a group with those of capturing a representative image of the group and select the image as a representative image of the group in case difference in at least one of the image capturing date and time and the image capturing place between them is larger than a predetermined reference value. By this, it is possible to prevent images which are similar each other from being selected as representative images.

Figure 4:
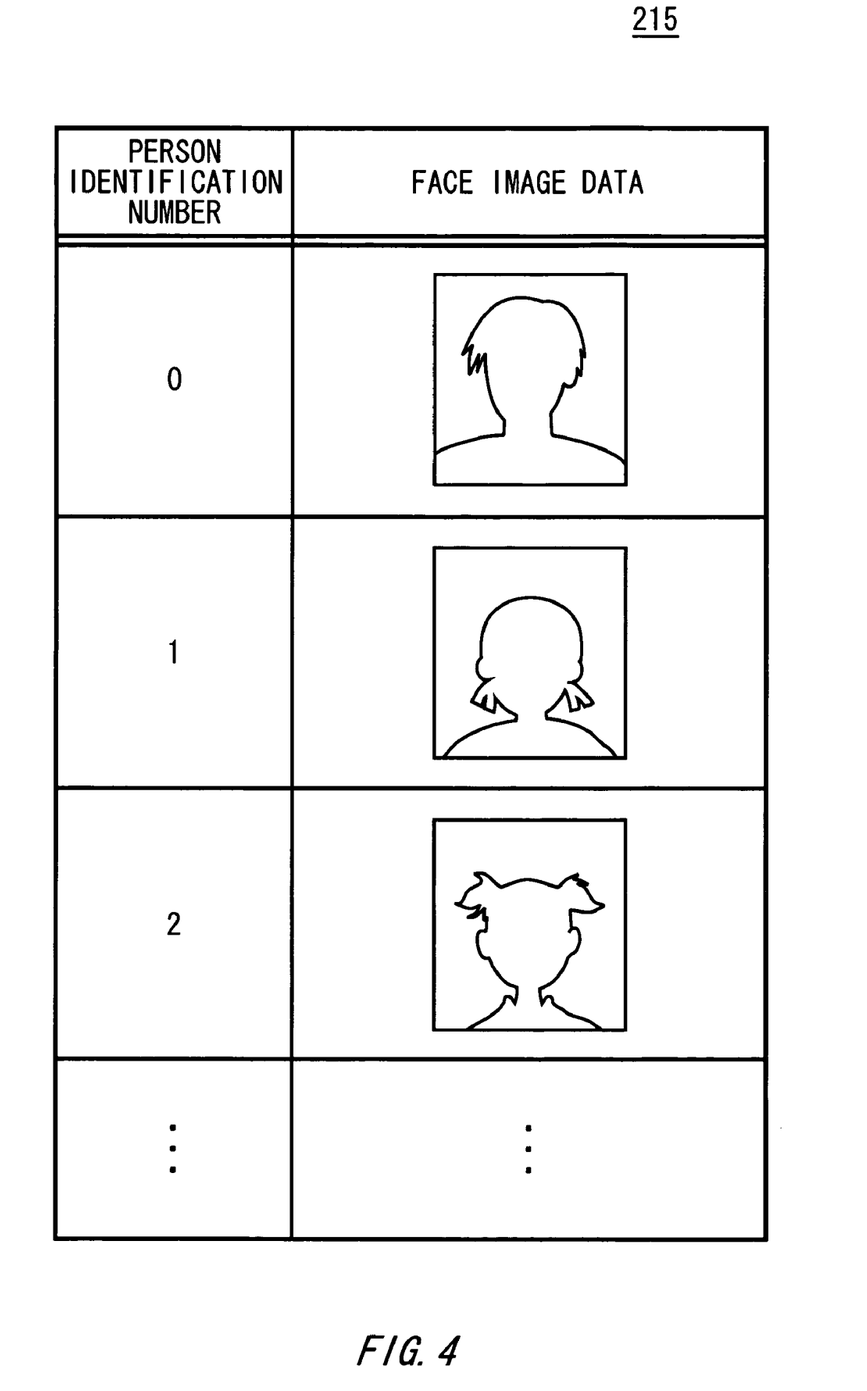
FIG. 4 shows an example of a data structure of a face image DB 215.

FIG. 4 shows an example of a data structure of the face image DB 215. Image data of a face image of a person is stored in the face image DB 215 to correspond to a person identification number of the person. For example, image data of a bust image of a person is stored in the face image DB 215 to correspond to an identification number 0 for identifying the person. By using the data, the person recognizing unit 210 can judge who is an object of an image.

Figure 5:
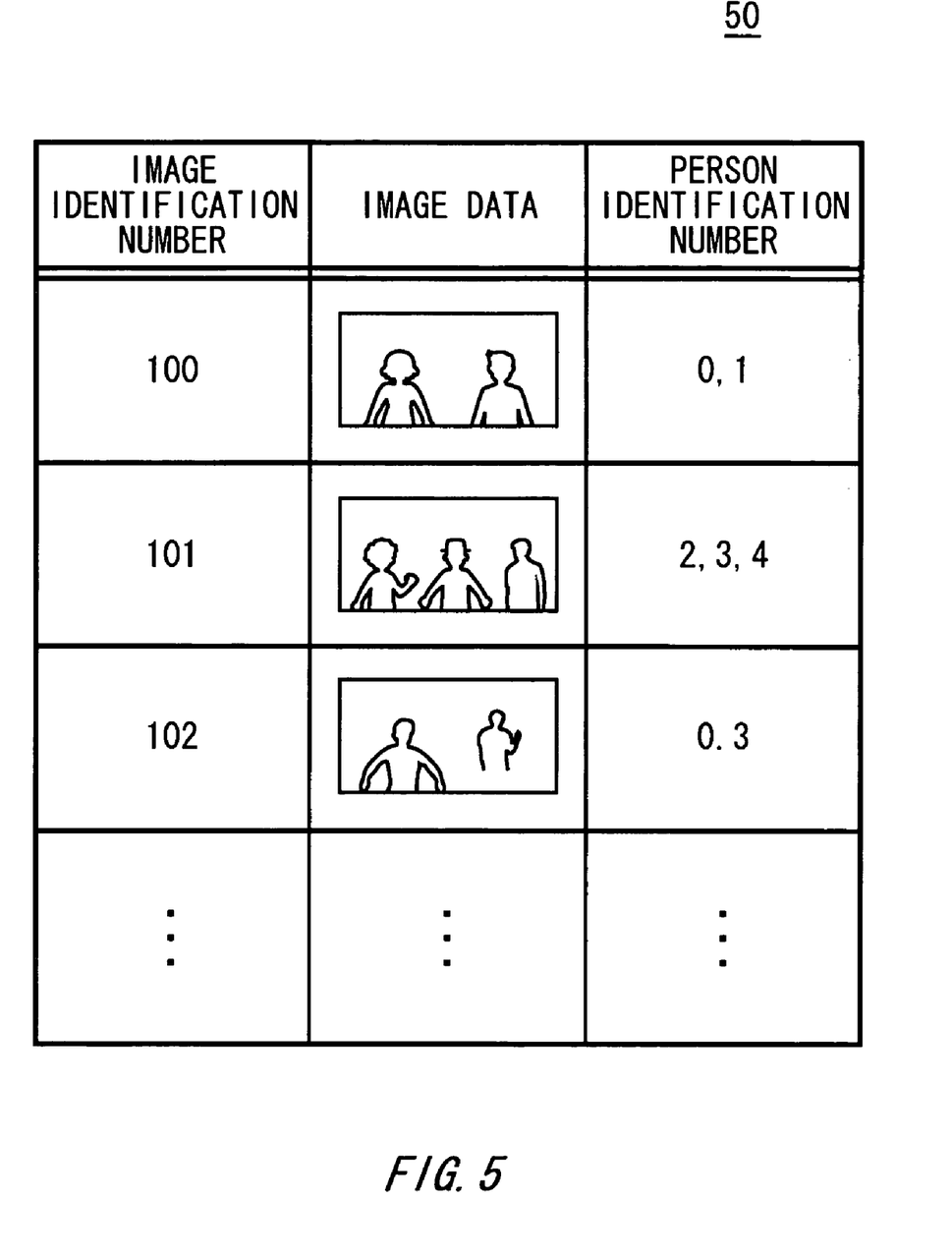
FIG. 5 shows an example of a data structure of a recognition result 50.

FIG. 5 shows an example of a data structure of the recognition result 50. The recognition result 50 includes image data of an image and a person identification number of each person included in the image for every image identification number. For example, information that an image of the image recognition number 100 includes persons of person identification numbers 0 and 1 is stored in the recognition result 50. By this, the image grouping unit 220 can specify the kind of combination of persons included in each image.

Figure 6:
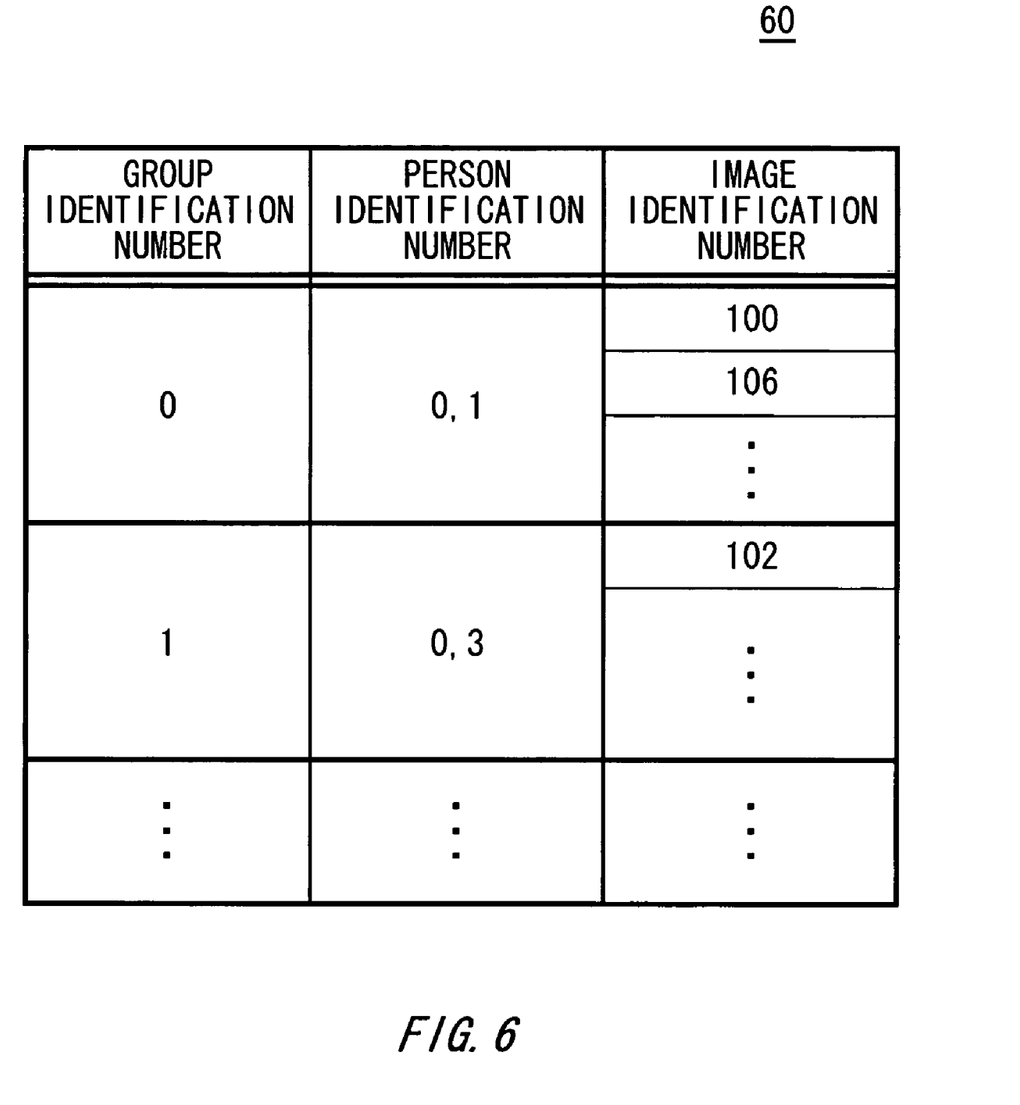
FIG. 6 shows an example of a data structure of a grouping result 60.

FIG. 6 shows an example of a data structure of the grouping result 60. For each group identification number for identifying a group, the grouping result 60 includes a combination of person identification numbers of persons who are objects of an image classified as the group and image identification numbers of images classified as the group. By this, the representative image selecting unit 230 can recognize images classified as a group to be objects to be selected as a representative of the group.

Figure 7:
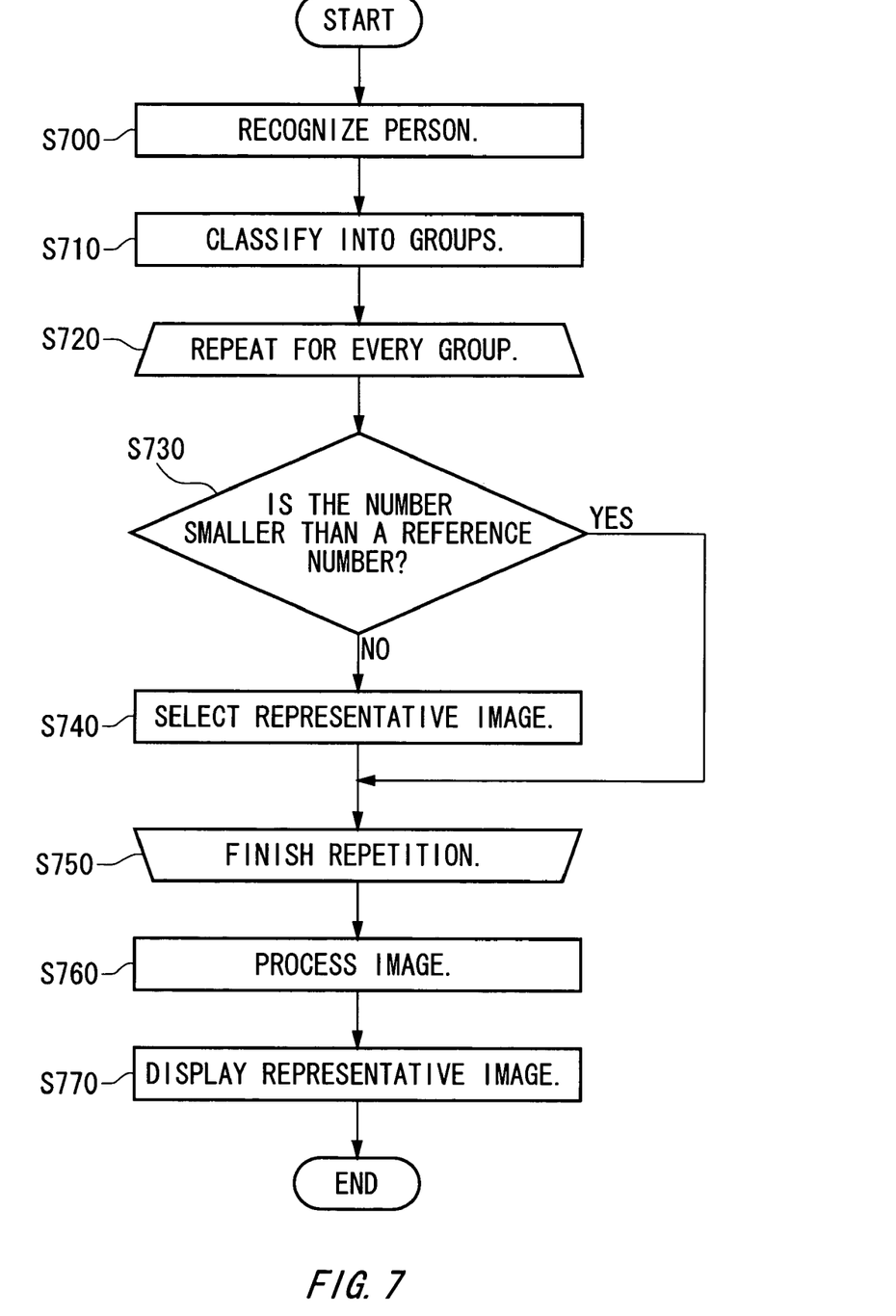
FIG. 7 shows an example of a flow of operation of the electronic album system 10.

FIG. 7 shows an example of a flow of operation of the electronic album system 10. The person recognizing unit 210 recognizes a plurality of persons included in each of a plurality of images (S700). Here, the person recognizing unit 210 may record the recognition result of recognizing persons included in each image as tag information of a file storing image data of the image. Then, the image grouping unit 220 classifies the plurality of images by combination of persons included in an image on the basis of the recognition result by the person recognizing unit 210 (S710).

Preferably, in case the number of images in which a person is included as an object is smaller than a predetermined reference number, the image grouping unit 220 classifies a plurality of images by combination of persons included in the plurality of images except the person. By this, it is possible to prevent a person who passes behind incidentally when an image is captured from being used as a reference of classification and more groups than is necessary from being generated.

Then, the electronic album display system 10 repeats the following processes for every group (S720). The representative image selecting unit 230 judges whether or not the number of images classified as the group is smaller than a predetermined reference number (S730). In case the number is larger than the reference number (S730: No), the representative image selecting unit 230 selects a representative image from the group (S740). Further, in case the number is smaller than the reference number (S730: Yes), the representative image selecting unit 230 does not select a representative image from the group.

Here, the number of representative images to be selected from each group has a large effect on easiness of browsing all the images or convenience. For example, if a small number of representative images are selected for a group including a large number of images, it is difficult to perceive characteristics of the whole of the group. Thus, it is preferable that the more images a group includes, the more representative images the representative image selecting unit 230 selects from the group.

Further, in case a group includes a large number of pictures which are very similar each other, it is not preferable to select many representative images even if the number of images included in the group is large. It makes the user feel dull if pictures which seem similar are displayed successively. In other words, it is preferable that some representative images are selected for even a group including a relatively small number of images.

Thus, for example, the less images a group includes, the higher is a rate of representative images selected by the representative image selecting unit 230 to all images included in the group. In other words, for example, the representative image selecting unit 230 selects 10 percent (%) of total 100 images, that is, 10 images, as representative images. Further, the representative image selecting unit 230 selects 20 percent (%) of total 10 images, that is, two (2) images, as representative images. As above, the number of representative images selected from each group is not proportional to the number of all images included in the group. Thus, it is possible to select a rare image of a group as a representative image even if a large number of the same images are included in the group and thus to make the user feel interesting.

The electronic album display system 10 repeats the above processes for every group (S750). The image processing unit 240 performs a predetermined image processing for each representative image (S760). For example, the image processing unit 240 performs blurring on a part of each representative image showing a person who is included in images of a number smaller than a reference number out of all the images of the image storing unit 200. By this, it is difficult for the user to view a person who probably passes behind incidentally when an image is captured and it is possible to make a person whose image is captured relatively easily viewed. Then, the image display unit 30 displays each of the representative images which are selected by the representative image selecting unit 230 and on which a blurring process is performed by the image processing unit 240, consecutively (S770).

Figure 8:
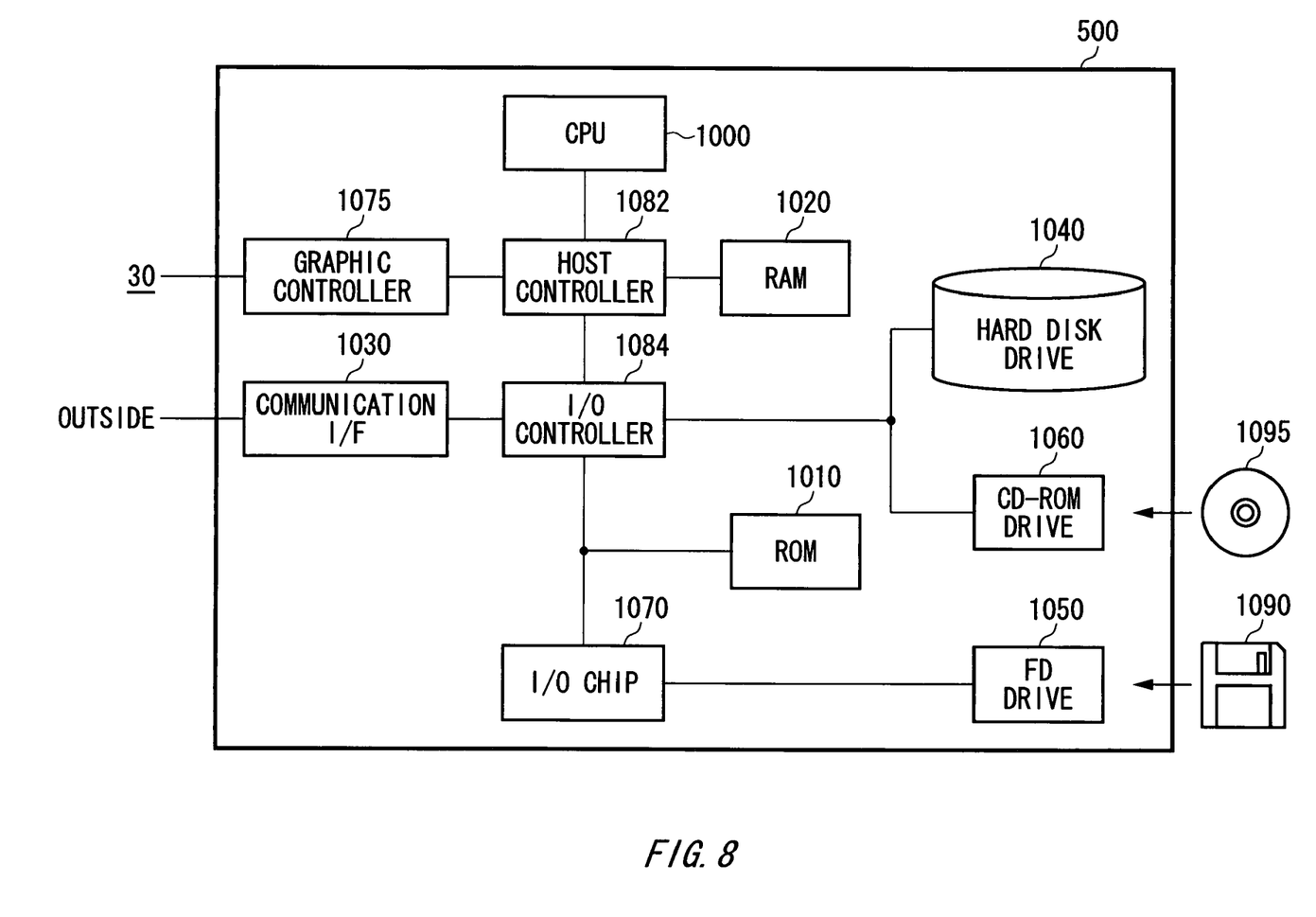
FIG. 8 shows an example of a hardware configuration of a computer 500 which functions as the electronic album reproducing unit 20.

FIG. 8 shows an example of a hardware configuration of a computer 500 which functions as the electronic album reproducing unit 20. The computer 500 includes a CPU peripheral part comprising a CPU 1000, a RAM 1020, and a graphic controller 1075, which are connected with each other by a host controller 1082, an input and output part comprising a communication interface 1030 connected to the host controller 1082 by an input and output controller 1084 ("I/O controller 1084"), a hard disk drive 1040, and a CD-ROM drive 1060, and a legacy input and output part comprising a ROM 1010 connected to the I/O controller 1084, a flexible disk drive 1050, and an input and output chip 1070 ("I/O chip 1270").

The host controller 1082 connects the RAM 1020 with the CPU 1000 having access to the RAM 1020 at a high transmission rate and the graphic controller 1075. The CPU 1000 operates and performs control of each part on the basis of programs stored in the ROM 1010 and the RAM 1020. The graphic controller 1075 acquires image data which is generated on a frame buffer provided in the RAM 1020 by the CPU 1000, etc. and displays it on the image display unit 30. Instead, the graphic controller 1075 may include a frame buffer storing an image data generated by the CPU 1000, etc. therein.

The I/O controller 1084 connects the host controller 1082 with the communication interface 1030, which is a relatively high-speed I/O apparatus, the hard disk drive 1040, and the CD-ROM drive 1060. The communication interface 1030 communicates with an apparatus of the outside via a network. The hard disk drive 1040 stores a program and data used by the computer 500. The CD-ROM drive 1260 retrieves a program or data from a CD-ROM 1095 and provides the I/O chip 1070 via the RAM 1020 with it.

Further, the I/O controller 1084 is connected with the ROM 1010 and a relatively low-speed I/O apparatus such as the flexible disk drive 1050 and the I/O chip 1070. The ROM 1010 stores a program executed by the CPU 1000 when the computer 500 starts to operate, a program depending on hardware of the computer 500, and the like. The flexible disk drive 1050 retrieves a program or data from a flexible disk 1090 and provides the I/O chip 1070 via the RAM 1020 with it. The I/O chip 1070 connects the flexible disk drive 1090 with various I/O apparatus via a parallel port, a serial port, a keyboard port, a mouse port, and the like.

A program is stored in a recording medium such as the flexible disk 1090, the CD-ROM 1095, or an IC-card and provided to the computer 500 by a user. The program retrieved from the recording medium via the I/O chip 1070 and/or the I/O controller 1084 is installed in the computer 500 and executed. Description on process of the program installed in the computer 500 and executed making the computer 500 operate is omitted because it is the same as the process by the electronic album reproducing unit 20 described with respect to FIGS. 1 and 7.

The program described above may be stored in a recording medium of the outside. An optical recoding medium such as a DVD, a PD, etc., a magneto-optical recording medium such as an MD, a tape medium, and a semiconductor memory such as an IC card can be used as the recoding medium in addition to the flexible disk 1090 and the CD-ROM 1095. Further, a storing apparatus such as a hard disk or a RAM provided in a server system connected with a dedicated communication network and internet may be used as the recording medium and may provide the computer 500 with the program through the network.

As above, according to the present embodiment, it is possible to improve convenience of browse and search of images by grouping the images by combination of persons which are objects of the images. Further, the number of representative images is determined according to the umber of images included in each group. By this, it is possible to select a representative image reflecting characteristics of all images which are objects to be displayed.

Although the present invention has been described by way of exemplary embodiments, it should be understood that those skilled in the art might make many changes and substitutions without departing from the spirit and the scope of the present invention which is defined only by the appended claims.

What is claimed is:

1. An electronic album display system for displaying a plurality of images included in an electronic album comprising:
   an image storing unit in which the plurality of images are stored;
   a person recognizing unit for automatically identifying, by face recognition, a plurality of persons included in each of the plurality of images, each of the persons corresponding to a person identification number, the result of the person recognition comprising image identification numbers that correspond to different combinations of a plurality of person identification numbers;
   an image grouping unit for classifying all of the plurality of images into a plurality of different groups based on the result of the person recognition, the images that belong to the same group including persons that correspond to the same combination of the person identification numbers, the result of the image grouping comprising group identification numbers, each of which corresponding to each of the combinations of the person identification numbers;
   a representative image selecting unit for selecting a representative image from the images that correspond to the same group identification number; and
   an image display unit for displaying each of the selected representative images consecutively.

2. The electronic album display system as claimed in claim 1, wherein the number of representative images selected from images belonging to a first group that includes more images is greater than the number of representative images selected from images belonging to a second group that includes images.

3. The electronic album display system as claimed in claim 1, wherein said representative image selecting unit selects a representative image for each of the groups, while selecting no representative image when the number of the images belonging to said each group is less than a predetermined reference number.

4. The electronic album display system as claimed in claim 1, wherein a ratio of the number of representative images selected from images belonging to a first group that includes less images to the number of the images of the first group is greater than a ratio of the number of representative images selected from images belonging to a second group that includes more images to the number of the images of the second group.

5. The electronic album display system as claimed in claim 1, wherein, for each group, said representative image selecting unit selects images as representative images of the each group when a difference between said images in at least one of an image capturing date and time and an image capturing place is greater than a predetermined reference value.

6. The electronic album display system as claimed in claim 1, wherein said image grouping unit classifies the plurality of images on the basis of the combinations of the person identification numbers, the persons corresponding to which being selected by excluding a person the number of images including whom is smaller than a predetermined reference number from all the persons included as objects in any of said plurality of images.

7. The electronic album display system as claimed in claim 6, further comprising an image processing unit for performing blurring on a part of each representative image showing a person the number of images including whom is smaller than a predetermined reference number, wherein said image display unit displays the representative image on which blurring is performed.

8. An image grouping apparatus for classifying a plurality of images comprising:
   an image storing unit in which the plurality of images are stored;
   a person recognizing unit for automatically identifying, by face recognition, a plurality of persons included in each of the plurality of images, each of the persons corresponding to a person identification number, the result of the person recognition comprising image identification numbers that correspond to different combinations of a plurality of persons identification numbers; and
   an image grouping unit for classifying all of the plurality of images into a plurality of different groups based on the result of the person recognition, the images that belong to the same group including persons that correspond to the same combination of the person identification numbers, the result of the image grouping comprising group identification numbers, each of which corresponding to each of the combinations of the person identification numbers.

9. An electronic album display method for displaying a plurality of images included in an electronic album comprising:
   a person recognizing step of automatically identifying, by face recognition, a plurality of persons included in each of the plurality of images, each of the persons corresponding to a person identification number, the result of the person recognition comprising image identification numbers that correspond to different combinations of a plurality of person identification numbers;
   an image grouping step of classifying all of the plurality of images into a plurality of different groups based on the result of the person recognition, the images that belong to the same group including persons that correspond to the same combination of the person identification numbers, the result of the image grouping comprising group identification numbers, each of which corresponding to each of the combination of the person identification numbers;
   a representative image selecting step of selecting a representative image from the images including the same group identification number; and
   an image display step of displaying each of the selected representative images consecutively.

10. A computer readable medium storing thereon a computer program for making a computer display a plurality of images included in an electronic album, wherein the computer comprises:
   an image storing unit in which the plurality of images are stored;
   a person recognizing unit for automatically identifying, by face recognition, a plurality of persons included in each of the plurality of images, each of the persons corresponding to a person identification number, the result of the person recognition comprising image identification numbers that correspond to different combinations of a plurality of person identification numbers;
   an image grouping unit for classifying all of the plurality of images into a plurality of different groups based on the result of the person recognition, the images that belong to the same group including persons that correspond to the same combination of the person identification numbers, the result of the image grouping comprising group identification numbers, each of which corresponding to each of the combinations of the person identification numbers;
   a representative image selecting unit for selecting a representative image from the images that correspond to the same group identification number; and
   an image display unit for displaying each of the selected representative images consecutively.

11. An image grouping method for grouping a plurality of images comprising:
   a person recognizing step of automatically identifying, by face recognition, a plurality of persons included in each of the plurality of images, each of the persons corresponding to a person identification number, the result of the person recognition comprising image identification numbers that correspond to different combinations of a plurality of person identification numbers; and
   an image grouping step of classifying all of the plurality of images into a plurality of different groups based on the result of the person recognition, the images that belong to the same group including persons that correspond to the same combination of the person identification numbers, the result of the image grouping comprising group identification numbers, each of which corresponding to each of the combinations of the person identification numbers.

12. A computer readable medium storing thereon a computer program for making a computer classifies a plurality of images, wherein the computer comprises:
   an image storing unit in which the plurality of images are stored;
   a person recognizing unit for automatically identifying, by face recognition, a plurality of persons included in each of the plurality of images, each of the persons corresponding to a person identification number, the result of the person recognition comprising image identification numbers that correspond to different combinations of a plurality of person identification numbers; and
   an image grouping unit for classifying all of the plurality of images into a plurality of different groups based on the result of the person recognition, the images that belong to the same group including persons that correspond to the same combination of the person identification numbers, the result of the image grouping comprising group identification numbers, each of which corresponding to each of the combinations of the person identification numbers.

* * * * *